United States Patent [19]

Takahashi et al.

[11] Patent Number: 4,869,099
[45] Date of Patent: Sep. 26, 1989

[54] DEVICE FOR DETECTING THE AMOUNT OF THE AIR INTAKEN BY AN INTERNAL COMBUSTION ENGINE

[75] Inventors: Akira Takahashi, Kyoto; Yasuo Tada, Himeji, both of Japan

[73] Assignees: Mitsubishi Jidosha Kogyo Kabushiki; Mitsubishi Denki Kabushiki Kaisha, both of Japan

[21] Appl. No.: 289,518

[22] Filed: Dec. 27, 1988

Related U.S. Application Data

[63] Continuation of Ser. No. 23,565, Mar. 9, 1987, abandoned.

[30] Foreign Application Priority Data

Mar. 11, 1986 [JP] Japan .................................. 61-34817

[51] Int. Cl.$^4$ ................................................. G01F 1/32
[52] U.S. Cl. .................................. 73/118.2; 73/861.22
[58] Field of Search ............ 73/861.06, 861.18, 861.22, 73/861.23, 861.14, 862.27, 862.28, 861.29, 861.31, 118.2

[56] References Cited

U.S. PATENT DOCUMENTS

| | | | |
|---|---|---|---|
| 3,818,877 | 6/1974 | Barrera et al. | 123/32 EA |
| 3,965,730 | 6/1976 | Innes | 73/118 |
| 4,299,121 | 11/1981 | Asayama et al. | 73/118.2 |
| 4,446,824 | 5/1984 | Endo et al. | 73/118.2 X |
| 4,448,064 | 5/1984 | Asayama | 73/118.2 |
| 4,452,089 | 5/1984 | Wada | 73/861.23 |
| 4,478,087 | 10/1984 | Asayama | 73/861.22 |
| 4,555,937 | 12/1985 | Sumal | 73/118 |
| 4,815,324 | 3/1989 | Tada et al. | 73/861.22 |

FOREIGN PATENT DOCUMENTS 58-56415 12/1982 Japan .

OTHER PUBLICATIONS

Joy, Robert D., "Air Flow Measurement for Engine Control", Feb. 23, 1976, p. 5.

*Primary Examiner*—Stewart J. Levy
*Assistant Examiner*—Robert P. Bell
*Attorney, Agent, or Firm*—Leydig, Voit & Mayer

[57] ABSTRACT

A device for detecting the amount of intake air for an internal combustion engine, which comprises a detect control circuit provided on the outer periphery of a member which forms an intake air path and which detects the amount of the intaken air, the detect control circuit having a pressure sensor and a second waveform shaping circuit which shapes and produces a difference between the output signal of the pressure sensor and the output signal of a low-pass filter. A pressure take-out port of the pressure sensor is so located as to detect the pressure in the outer periphery of the member which forms an air path, and the member and the detect control circuit are contained in the air cleaner.

4 Claims, 4 Drawing Sheets

DEVICE FOR DETECTING THE AMOUNT OF THE AIR INTAKEN BY AN INTERNAL COMBUSTION ENGINE

This application is a continuation of application Serial No. 07/023,565, filed Mar. 9, 1987, now abandoned.

BACKGROUND OF THE INVENTION

The present invention relates to a device for detecting the amount of intake air for by an internal combustion engine and, more particularly, to an apparatus for mounting an intake air flow rate detector in an intake air path of an internal combustion engine.

A fuel injection system of an internal combustion engine must continuously measure the amount of the intaken air. This measurement is taken by a vortex flow meter in which a vortex generator is placed in an intake air path, and Karman vortices which results on the downstream side of the vortex generator are measured to determine the flow rate of the fluid. This vortex flow meter contains no moving parts and is not effected by vibration, lending itself well for use in an internal combustion engine which vibrates and, particularly, for use in an automobile.

FIG. 1 shows a conventional vortex flow meter that is disclosed in Japanese Patent Publication No. 56415/1983, wherein reference numeral 1 denotes a flow meter having a vortex generator 2, and 3 denotes the Karman's vortex street that is generated. The vortex generator 2 is installed in an intake air path of an internal combustion engine. Reference numeral 4 denotes an ultrasonic wave generator which is provided so as to propagate ultrasonic waves across the Karman's vortex street 3, reference numeral 5 denotes an ultrasonic wave receiver which receives ultrasonic waves, numeral 6 denotes an oscillation circuit for oscillating the ultrasonic wave generator 4, reference numeral 7 denotes a voltage controlled phase deviation circuit which controls the phase deviation angle from the output signal of the oscillation circuit 6 dependng upon the output voltage of a loop filter 10, reference numeral 8 denotes a first waveform shaping circuit which amplifies and shapes the output of the ultrasonic wave receiver 5, reference numeral 9 denotes a phase comparator which receives, as a first input signal, the output of the first waveform shaping circuit 8 and receives, as a second input signal, the output of the voltage controlled phase deviation circuit 7, in order to detect the phase difference between the first input signal and the second input signal, numeral 10 denotes a loop filter which removes unnecessary frequency components from the output of the phase comparator 9, and 11 denotes a low-pass filter which removes carrier frequency components from the output of the phase comparator 9.

The operation of the prior art device will now be described. First, ultrasonic waves generated from the ultrasonic wave generator 4 are phase-modulated by the Karman vortices 3, and are received by the ultrasonic wave receiver 5. The received waves are then shaped by the waveform shaping circuit 8. A phase synchronizing loop is constituted by the oscillation circuit 6, voltage controlled phase deviation circuit 7, phase comparator 9 and loop filter 10. The voltage controlled phase deviation circuit 7 controls the phase deviation angle to maintain only a high frequency stability of the signals of an ultrasonic wave oscillation frequency. Further, characteristics of the loop filter 10 in the phase synchronizing loop are set to be capable of following at a sufficiently high speed the modulated angular frequency of the signals of which the phase is modulated by Karman vortices. The output of the loop filter 10 so changes the output of the voltage controlled phase deviation circuit 7 that it is brought into synchronism with the ultrasonic received signal, and is directly used as a phase demodulated output. A phase synchronizing angle of the phase synchronizing loop is determined by the characteristics of the phase comparator 9 and of the loop filter 10.

The intake air of an internal combustion engine does not flow uniformly but pulsates. Therefore, the Karman's vortex street 3 generated by the vortex generator 2 is unstable. Pulsation of the intake air develops particularly in a multi-cylinder engine in which the intake valves operate in an overlapped manner. The overlapping gives rise to the formation of a surge pulse of negative pressure at a moment when the intake valve is opened. When the throttle valve is nearly fully opened, there is obtained a no orifice effect and the surge pulse of a negative pressure does not attenuate. This fact causes Karman's vortex street 3 to develop irregularly. In the intake air path, therefore, the pressure varies as indicated by a dotted line in FIG. 2(a). Hence, the output of the vortex flow meter at the low-pass filter 11 pulsates as indicated by a solid line in FIG. 2(a). FIG. 2(b) shows this output which shaped as a step function, wherein the broken lines indicate that outputs are missing, improperly detecting the number of Karman vortexes 3, and, thus amount of the air intaken by the internal combustion engine is not correctly dectected by the vortex flow meter. In copending Application Serial Number 07/038,607, filed Apr. 15, 1987, a compensating system is disclosed which is added to a vortex flow meter for removing pressure-dependent components from the output due to fluctuations in pressure in the intake air stream. This compensation system utilizes a pressure sensor which senses pressure and produces an output representing the pressure fluctuations.

SUMMARY OF THE INVENTION

It is an object of this invention to provide a mounting structure for a vortex flow meter and compensating system pressure sensor of the type disclosed in the copending application previously referred to which is incorporated in the support arrangement for the air cleaner for an internal combustion engine and, thus, is located in the air path to the engine to provide an accurate representation of the actual flow rate of the intake air.

BRIEF DESCRIPTION OF THE DRAWINGS

FIG. 3 is a diagram illustrating the vortex flow meter with compensating system as disclosed in the copending applicaton previously refered to;

In the drawings, the same reference numerals denote the same or corresponding portions.

DESCRIPTION OF THE PREFERRED EMBODIMENT

An embodiment of the invention will now be described in conjunction with the accompanying drawings.

Figure 3:
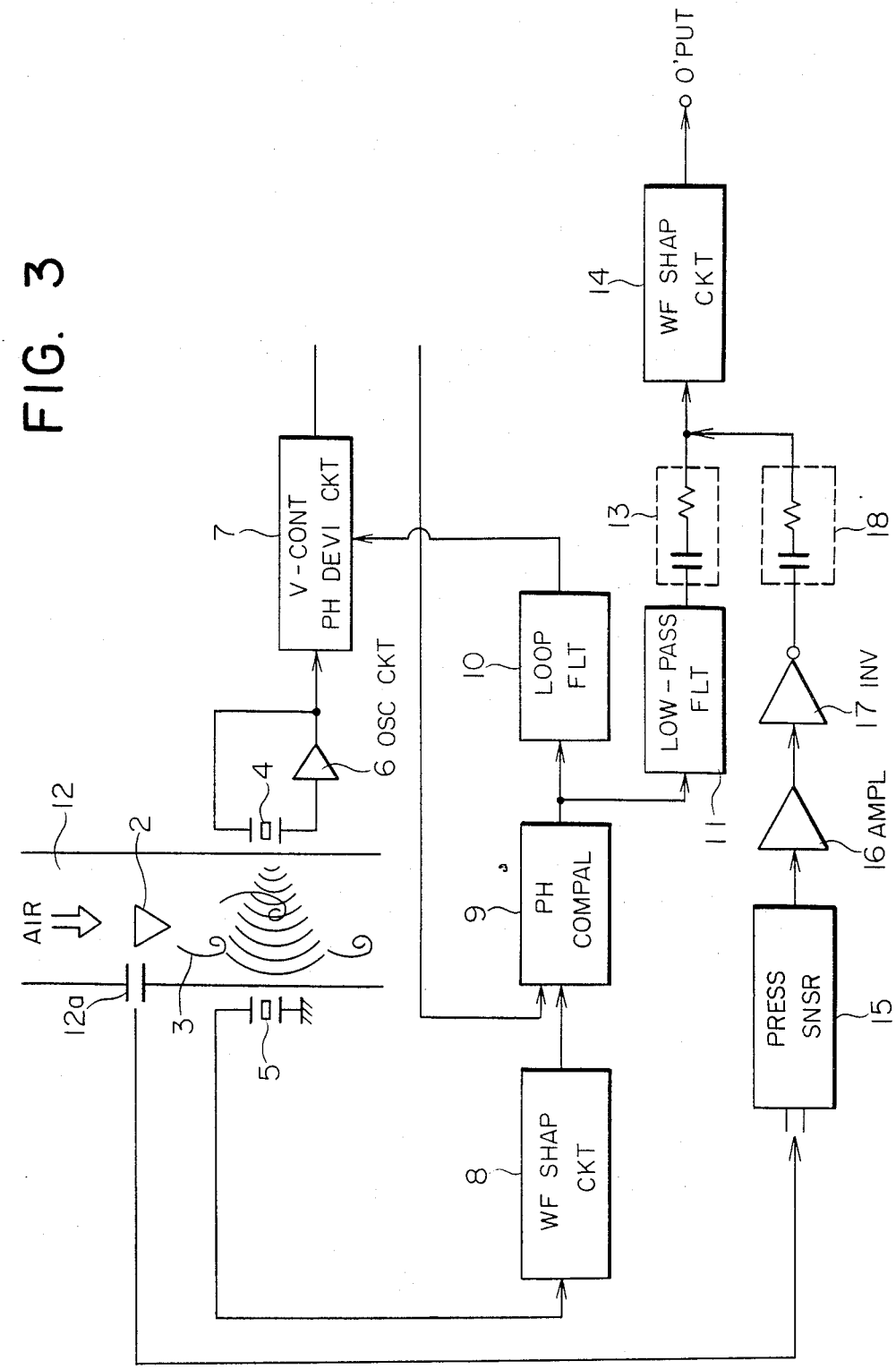

In FIG. 3, a vortex flow meter and compensating system is disclosed wherein reference numeral 12 denotes an intake air path of an internal combustion engine, numeral 2 denotes a vortex generator disposed in the path, numeral 13 denotes a first CR series circuit provided on the output side of a low-pass filter 11, reference numeral 14 denotes a second waveform shaping circuit provided on the output side of the first CR series circuit 13, reference numeral 15 denotes a pressure sensor connected to a pressure take-out port 12a that is provided on an upstream side of the intake air path 12, reference numeral 16 denotes an amplifier provided on the output side of the pressure sensor 15, reference numeral 17 denotes an inverter provided on the output side of the amplifier 16, and reference numeral 18 denotes a second CR series circuit provided on the output side of the inverter 17, the output side of the second CR series circuit 18 being connected to the input side of the second waveform shaping circuit 14.

Figure 4:
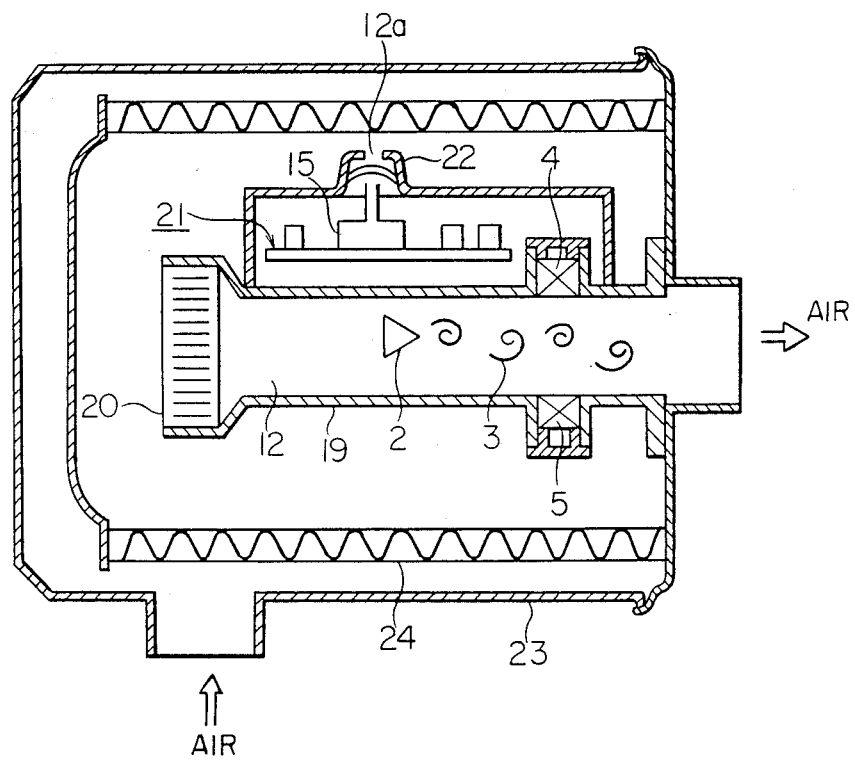
FIG. 4 is a sectional view of a mounting structure for a flow meter and compensating system as shown in FIG. 3.

According to the present invention, a vortex flow meter and compensating system, as shown in FIG. 3, is mounted in the intake air path by a structure shown in FIG. 4 which is a sectional view wherein reference numeral 19 denotes a member, which defines the intake air path 12, reference numeral 20 denotes a honeycomb flow straightener member provided on the upstream side of the air path member 19, and numeral 21 denotes components of a vortex flow meter and compensating system including an oscillation circuit 6, voltage controlled phase deviation circuit 7, first waveform shaping circuit 8, phase comparator 9, low-pass filter 10, low-pass filter 11, the first CR series circuit 13, the second waveform shaping circuit 14, the pressure sensor 15, the amplifier 16, the inverter 17, and the second CR series circuit 18.

The components 21 are provided on the outer periphery of the air path member 19 in which the vortex generator 2 is disposed. A pressure take-out port 12a adjacent the pressure sensor 15 of the detect control circuit 21 is so disposed as to detect the pressure in the outer peripheral portion of the air path member 19. Reference numeral 22 denotes a filter provided between the pressure take-out port 12a and the pressure sensor 15. The member 19 and the detect control circuit 21 are installed inside the filter 24 of the air cleaner 23.

Figure 1:
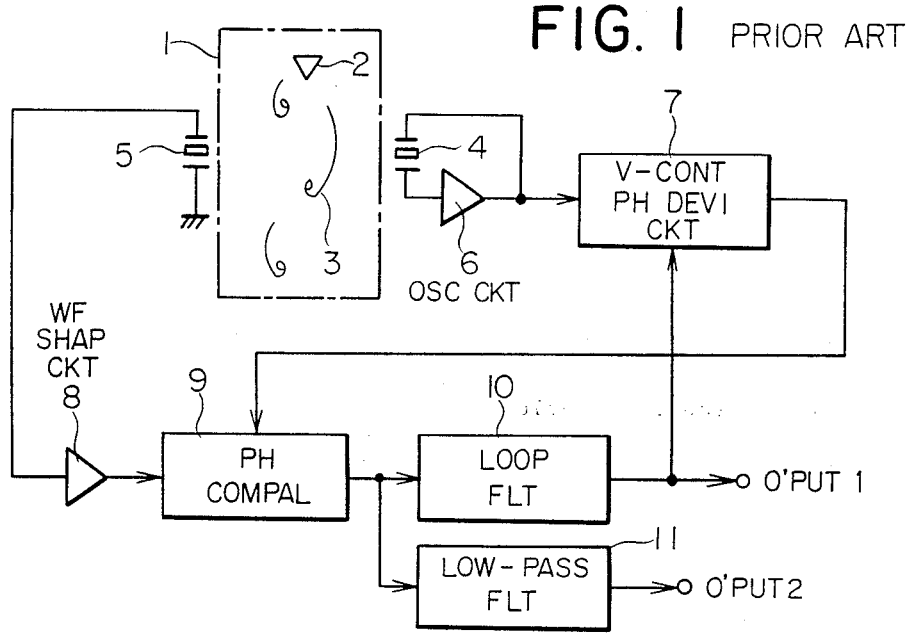
FIG. 1 is a diagram illustrating the structure of a conventional vortex flow meter.
Figure 2:
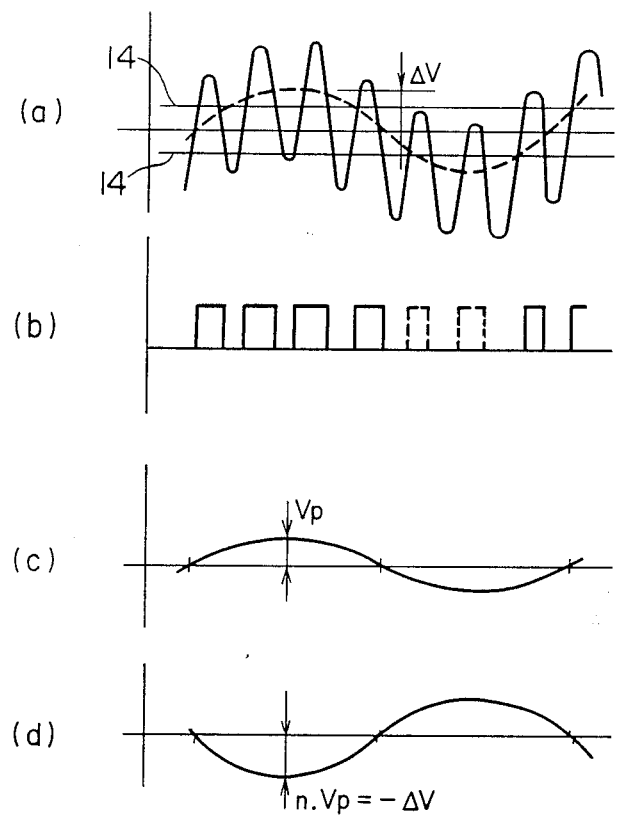
FIGS. 2(a), 2(b), 2(c) and 2(d) are diagrams showing operation waveforms of signals appearing in the circuits of FIGS. 1 and 3.

Operation of vortex flow meter compensating system will now be described. The pressure variation in the intake air path indicated by a broken line in FIG. 2(a) is detected by the pressure sensor 15 as shown in FIG. 2(c). The detected value is amplified n times by the amplifier 16, so as to correspond to the pressure variation, and is then inverted by the inverter 17 as shown in FIG. 2(d). The output of the low-pass filter 11 is smoothed by the first CR series circuit 13, the output of the inverter 17 is smoothed by the second CR series circuit 18, and these two outputs are added. The added output is then subjected to waveform shaping in the second waveform shaping circuit 14. In this case, pulsation in the output of the low-pass filter 11 is cancelled, and the output of the second waveform shaping circuit 14 contains no missing portion unlike the waveform indicated by dotted lines in FIG. 2(b), making it possible to correctly detect the amount of the intake air.

Figure 5:
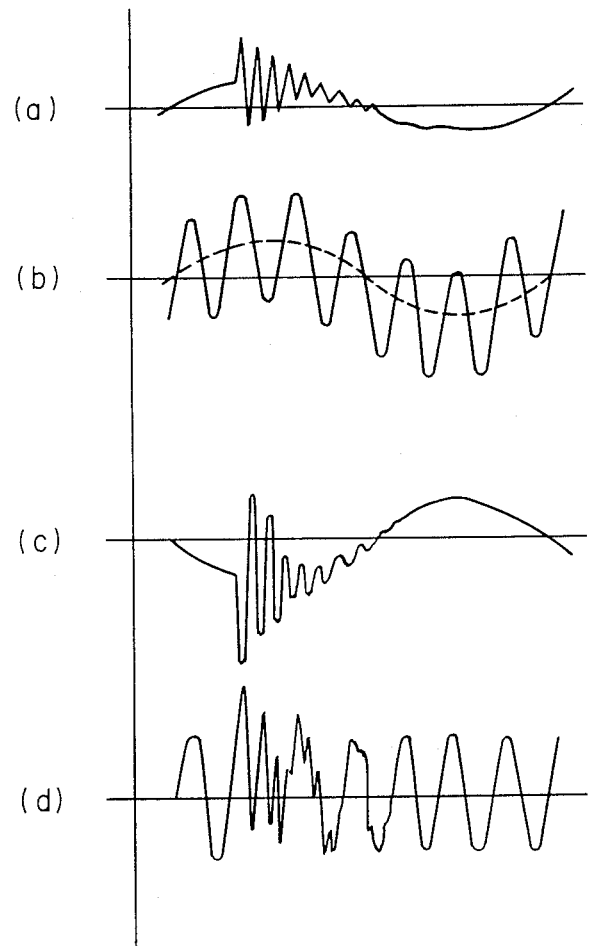
FIG. 5 is a diagram showing operation waveforms of signals appearing in the circuits of FIGS. 1 and 3 when the pressure in the intake air path contains high-frequency components.

Further, since the pressure take-out port 12a of the pressure sensor 15 is provided in the air cleaner 22, the device is not affected by high-frequency components contained in the pressure as will be described below. That is, the pressure in the intake air path 12 near the ultrasonic wave receiver 5 may contain high-frequency components as shown in FIG. 5(a) depending upon the condition in the intake air path on the downstream side of the vortex generator 2. Pulsation in the output signals of the low-pass filter 11 is filtered by the low-frequency pressure follow-up performance of the ultrasonic wave generator and receiver 4, 5, whereby the output signals are formed as shown in FIG. 5(b). Here, however, the pressure sensor 15 exhibits follow-up characteristics up to a high frequency. If the output of the pressure sensor 15 is amplified by n times and is added up (FIG. 5(c)), the device is affected by high-frequency components of the pressure as shown in FIG. 5(d) and makes it difficult to correctly detect the amount of the intaken air.

The above problem, however, can be solved if the area of the intake air path 12 is increased to decrease the fluidic high-frequency impedance of the intake air path 12, so that the high-frequency components are absorbed. If the pressure take-out port 12a is provided in the air cleaner 22, as done in the aforementioned embodiment, the air cleaner 22 works as a wide-area portion and the device is not affected by the high-frequency components contained in the pressure. Since a wide-area portion need not be separately provided in intake air path 12, the space is reduced and manufacturing cost decreased.

As described above, the device for detecting the amount of the intake air of the present invention cancels the pulsation of the low-pass filter caused by the pressure variation in the intake air path. Further, since the pressure take-out port and the detect control circuit are provided in the air cleaner, the amount of intake air can be correctly detected. Therefore, the present invention makes it possible to reduce the required space and to decrease the manufacturing cost.

What is claimed is:

1. An apparatus for mounting an intake air flow rate detector in an intake air path of an internal combustion engine, the detector having an ultrasonic transmitter and receiver and pressure sensor, said apparatus comprising:
   a member which forms a main air intake passageway having a vortex generator;
   a housing carried by said member;
   means for mounting said ultrasonic transmitter and receiver and said pressure sensor inside said housing;
   a port communicating between inside said housing and a region outside said housing; and
   an intake air cleaner including an air filter surrounding said member and said housing through which intake air passes into the region outside said housing, whereby said pressure sensor is exposed to the intake air through said port to sense the pressure thereof, and into said member forming the main air intake passageway.

2. An apparatus according to claim 1 wherein said member comprises a cylindrical member and a flow straightener member is provided at an entrance to said cylindrical member upstream of the vortex generator.

3. An apparatus according to claim 2 wherein said air filter comprises a cylindrical air filter surrounding said member and said housing.

4. An apparatus according to claim 3 wherein said intake air cleaner includes a casing having an air supply port through which air flows to said cylindrical air filter.

* * * * *

UNITED STATES PATENT AND TRADEMARK OFFICE
CERTIFICATE OF CORRECTION

PATENT NO. : 4,869,099
DATED : September 26, 1989
INVENTOR(S) : Takahashi et al.

It is certified that error appears in the above-identified patent and that said Letters Patent is hereby corrected as shown below:

On the title page:

In item [73], the first assignee should be:
--Mitsubishi Jidosha Kogyo Kabushiki Kaisha--.

Change the title, item [54], to read:
--APPARATUS FOR MOUNTING AN INTAKE AIR FLOW RATE DETECTOR IN AN INTERNAL COMBUSTION ENGINE--.

Signed and Sealed this

Twenty-second Day of October, 1991

Attest:

HARRY F. MANBECK, JR.

*Attesting Officer*      *Commissioner of Patents and Trademarks*